United States Patent [19]
Mattson

[11] 3,734,532
[45] May 22, 1973

[54] AUXILIARY WHEEL UNITS FOR THE RUNNING BOARDS OF A SNOWMOBILE

[76] Inventor: Martin L. Mattson, 10 Drake Road, Duluth, Minn. 55803

[22] Filed: July 21, 1971

[21] Appl. No.: 164,678

[52] U.S. Cl. ............280/150 A, 180/5 R, 280/47.32
[51] Int. Cl. .................................................B60s 9/00
[58] Field of Search ......................280/150 A, 47.32, 280/415 R; 180/5 R, 9.26; 301/111; 288/79.1, 79.2

[56] References Cited

UNITED STATES PATENTS

| | | |
|---|---|---|
| 3,043,618 | 7/1962 | Petirrojo..........................280/150 A |
| 3,217,478 | 11/1965 | De Geere .........................280/150 A |
| 3,480,096 | 11/1969 | Hammitt..............................180/5 R |

Primary Examiner—Leo Friaglia
Assistant Examiner—D. M. Mitchell
Attorney—Wicks & Nemer

[57] ABSTRACT

Auxiliary wheel units for application to the running boards of a snowmobile having upturned rims at their outer edges, said units each including a wheel, a body underlying the running board of the snowmobile with legs depending therefrom and straddling the wheel, an axle extending across the legs at their lower ends and journaling the wheel for rotation, the wheels engaging the ground at a locality below the ground engaging structure of the snowmobile and a hook at the outer end of the body for holding the unit detachably secured to the running board of the snowmobile.

2 Claims, 4 Drawing Figures

PATENTED MAY 22 1973 3,734,532

INVENTOR.
Martin L. Mattson
BY
Wicks & Nemer
ATTORNEYS

AUXILIARY WHEEL UNITS FOR THE RUNNING BOARDS OF A SNOWMOBILE

BACKGROUND OF THE INVENTION

The invention relates broadly to snowmobiles and more particularly to an auxiliary wheeled device for moving the snowmobile about manually by pushing and or pulling the same.

Snowmobiles having an endless track drive are difficult to move about when the track is not driven. It is an object of the invention to provide a pair of separate auxiliary wheels with one easily mounted on each running board of the snowmobile substantially at a point centrally of the snowmobile whereby the machine is balanced and may be moved about. It is an object of the invention to provide an auxiliary wheel for each running board of a snowmobile which may be easily mounted without the aid of bolts or clamps and therefore also easily removed.

In the drawings forming part of this application:

Figure 1:
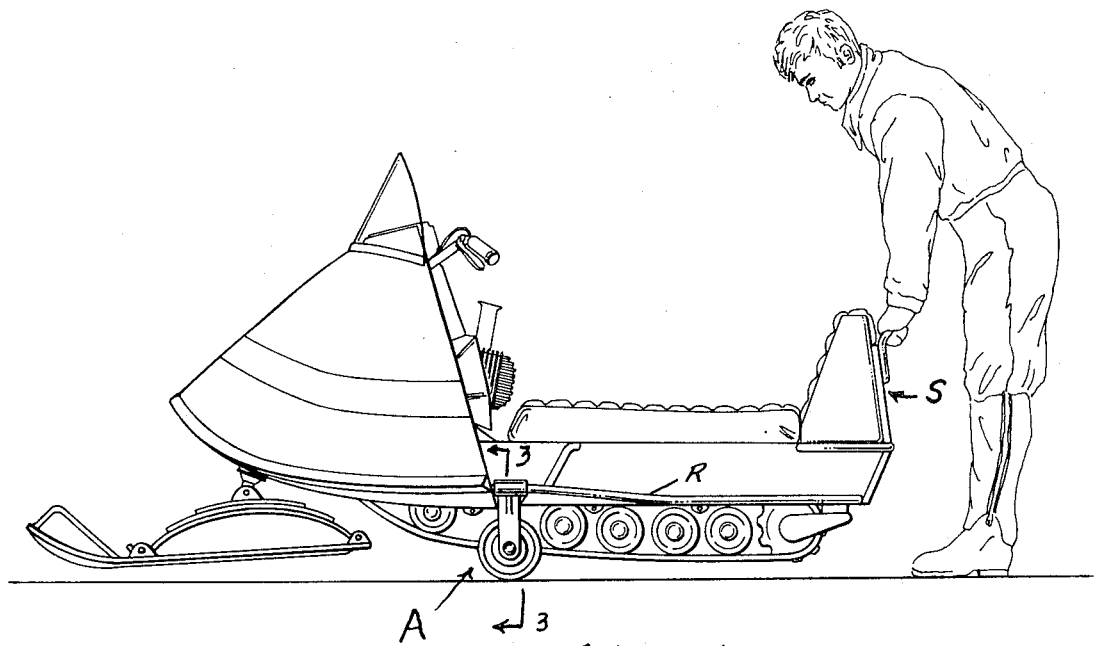
FIG. 1 is a side elevational view of a conventional snowmobile on which is mounted the auxiliary wheels embodying the invention.

Referring to the drawings in detail, the auxiliary wheel unit A includes the support portion 10 for engaging contact with the running board R of a snowmobile. The support portion 10 includes the flat body 12 which terminates at its outer end in the hook formation 14. The hook formation 14 engages the rim 16 formed on the outer edge of the running board with the flat body portion of the hook in substantially flat engagement with the substantially flat under surface of the running board. The hook formation 14 is through 180 degrees at the end 18 and of a U-shaped formation so that lateral displacement of the device outwardly from the running board is prevented, and displacement inwardly is prevented by the opposed portion of the hook as at 20. As will be seen the weight of the snowmobile S maintains the auxiliary wheel A fully upon the running board R.

Further provided is a first or outer leg 20 which depends from the underside of the flat body 12 and a second or inner leg 22 depending from the underside of the body 12 spaced from the first leg and parallel thereto. The legs 20 and 22 are disposed to the flat body 12 so that the legs are vertical although the body 12 is not in a horizontal position when on the angularly disposed running board.

Figure 2:
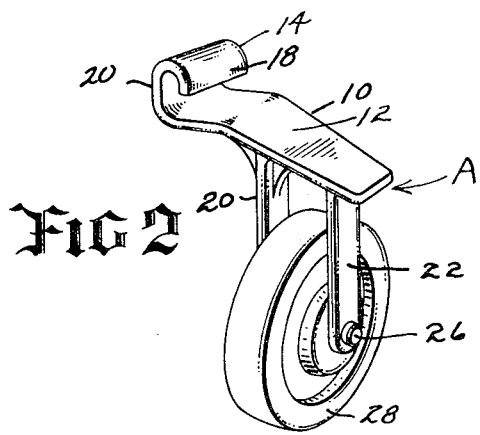
FIG. 2 is a perspective view of the auxiliary wheel removed from the snowmobile.
Figure 4:
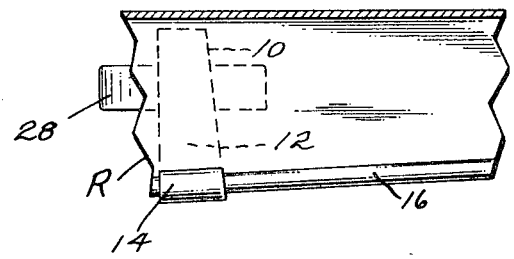
FIG. 4 is a top plan view of the auxiliary wheel in position on the running board of a snowmobile, portions of the running board being broken away.
Figure 3:
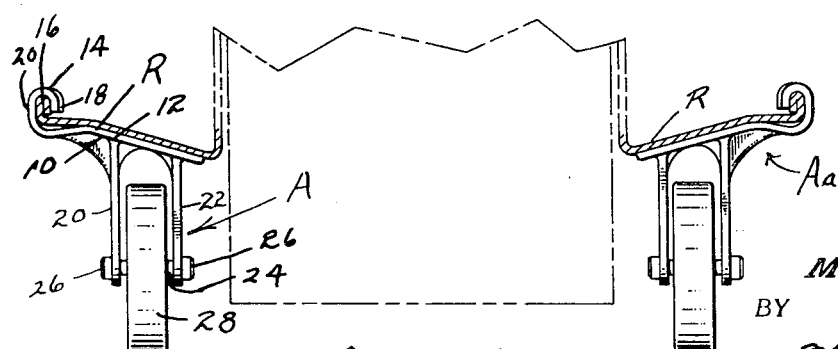
FIG. 3 is a sectional view substantially on the line 3—3 of FIG. 1 with the snowmobile in partial phantom outline.

The numeral 24 designates a shaft secured by nuts 26 between the lower ends of the legs 20 and 22. Rotatably mounted on the shaft 24 and between the legs 20 and 22 is the wheel 28. The auxiliary wheel A as shown in FIGS. 1, 2, and 4 and on the left of FIG. 3 may be termed a lefthand wheel. The auxiliary wheel Aa shown on the right of FIG. 3 is identical to that described but it is right as compared to left in the application to snowmobile.

The auxiliary wheel A is mounted on the running board R by raising the snowmobile slightly and hooking the hook portion 14 over the rim 16 of the running board and then placing the flat body portion 12 up under and in contact with the running board. With the weight of the snowmobile upon the auxiliary wheel units the same are aided in remaining in place. With the wheel units in place the snowmobile may be moved about and easily pivoted in such moving about.

I claim:

1. Auxiliary wheel units detachably secured to the running boards of a snowmobile having upturned rims at their outer edges, said units each comprising:
   a. a wheel
   b. a substantially flat body,
   c. legs depending from said body extending normal to the flat plane of said flat body and straddling the wheel,
   d. an axle extending across the legs at their lower ends and journaling said wheel for rotation,
   e. said legs of a length that said wheels engage the ground at a locality below the ground engaging structure of the snowmobile, and
   f. an elongated hook extending along the outer end of the body for engagement about a portion of the rim of the running board of the snowmobile and holding the unit detachably secured to the running board of the snowmobile, the axis of said elongated hook being normal to the axis of said axle.

2. Auxiliary wheel units detachably secured to the running boards of a snowmobile, said units each comprising:
   a. a rotatable member,
   b. a substantially flat body
   c. axle means mounting said rotatable member on said body for rotation, said rotatable members engaging the ground at a locality below the ground engaging structure of the snowmobile and
   d. attaching means in the form of a hook at the outer end of the flat body and overlying a portion of the flat body for holding the unit detachably secured to the running board of a snowmobile, the axis of said hook being normal to the axis of said axle.

* * * * *